United States Patent [19]

Katz et al.

[11] Patent Number: 4,847,513

[45] Date of Patent: Jul. 11, 1989

[54] POWER-OPERATED DEVICE WITH A COOLING FACILITY

[75] Inventors: Friedrich J. Katz, Severna Park; Salvatore R. Abbratozzato, Timonium, both of Md.

[73] Assignee: Black & Decker Inc., Newark, Del.

[21] Appl. No.: 160,908

[22] Filed: Feb. 26, 1988

[51] Int. Cl.⁴ ............................................. H02J 9/06
[52] U.S. Cl. .................................... 307/149; 307/150; 320/2; 30/DIG. 1
[58] Field of Search ................ 307/149, 150, 151, 64, 307/66; 30/376, 391, 388, 166 R, 165, DIG. 1; 363/21, 97, 17, 98; 323/285, 3; 320/2; 142/26, 39, 40; 144/222

[56] References Cited

U.S. PATENT DOCUMENTS

| | | |
|---|---|---|
| 2,590,805 | 3/1952 | Vitale . |
| 2,721,946 | 10/1955 | Weisberger et al. . |
| 3,079,510 | 2/1963 | Hartwig . |
| 3,174,048 | 3/1965 | Snyder et al. . |
| 3,201,742 | 8/1965 | English . |
| 3,257,599 | 6/1966 | Somers et al. ................... 30/DIG. 1 |
| 3,257,602 | 6/1966 | Potter et al. . |
| 3,641,419 | 2/1972 | Koltuniak et al. . |
| 3,769,571 | 10/1973 | Wilkinson . |
| 3,980,940 | 9/1976 | Mabuchi et al. ........................ 320/2 |
| 4,196,469 | 4/1980 | Gurwicz . |
| 4,227,243 | 10/1980 | Gurwicz et al. . |
| 4,333,134 | 6/1982 | Gurwicz . |
| 4,353,112 | 10/1982 | Rietveld et al. . |
| 4,365,288 | 12/1982 | Robe et al. . |
| 4,507,720 | 3/1985 | Colbrese . |
| 4,555,849 | 12/1985 | Ando et al. ......................... 320/2 X |
| 4,672,228 | 6/1987 | Swoboda ............................. 307/66 |

OTHER PUBLICATIONS

"Operating Instructions", Panasonic Omnivision VHS PV-A110 (undated).
"Operating Instructions", Sony AC Pack/Battery Charger ACP-8OUC (undated).

Primary Examiner—William M. Shoop, Jr.
Assistant Examiner—Paul Ip
Attorney, Agent, or Firm—J. Bruce Hoofnagle; Edward D. Murphy; Harold Weinstein

[57] ABSTRACT

A cordless power-operated device, such as a saw 20, is powered by a low level D.C. voltage provided by battery pack cells to operate the saw in a cordless mode. The cells are housed in a container 32 which fits into a cavity 23 formed in a housing 22 of saw 20. Another container 66 includes a first section 64 which is shaped externally in the same configuration as container 32. First section 64 houses a voltage converter 62 which converts conventional A.C. voltage, such as 120 volts at 60 Hz, to the low level D.C. voltage required to operate saw 20. Container 66 can be inserted into cavity 23 of saw 20 and voltage converter 62 can be connected to a conventional A.C. source to operate the saw in a corded mode. Container 66 also includes a second section 68 which houses a cooling motor 70. Cooling motor 70 provides powered cooling of saw motor 28, the cooling motor and voltage converter 62.

17 Claims, 3 Drawing Sheets

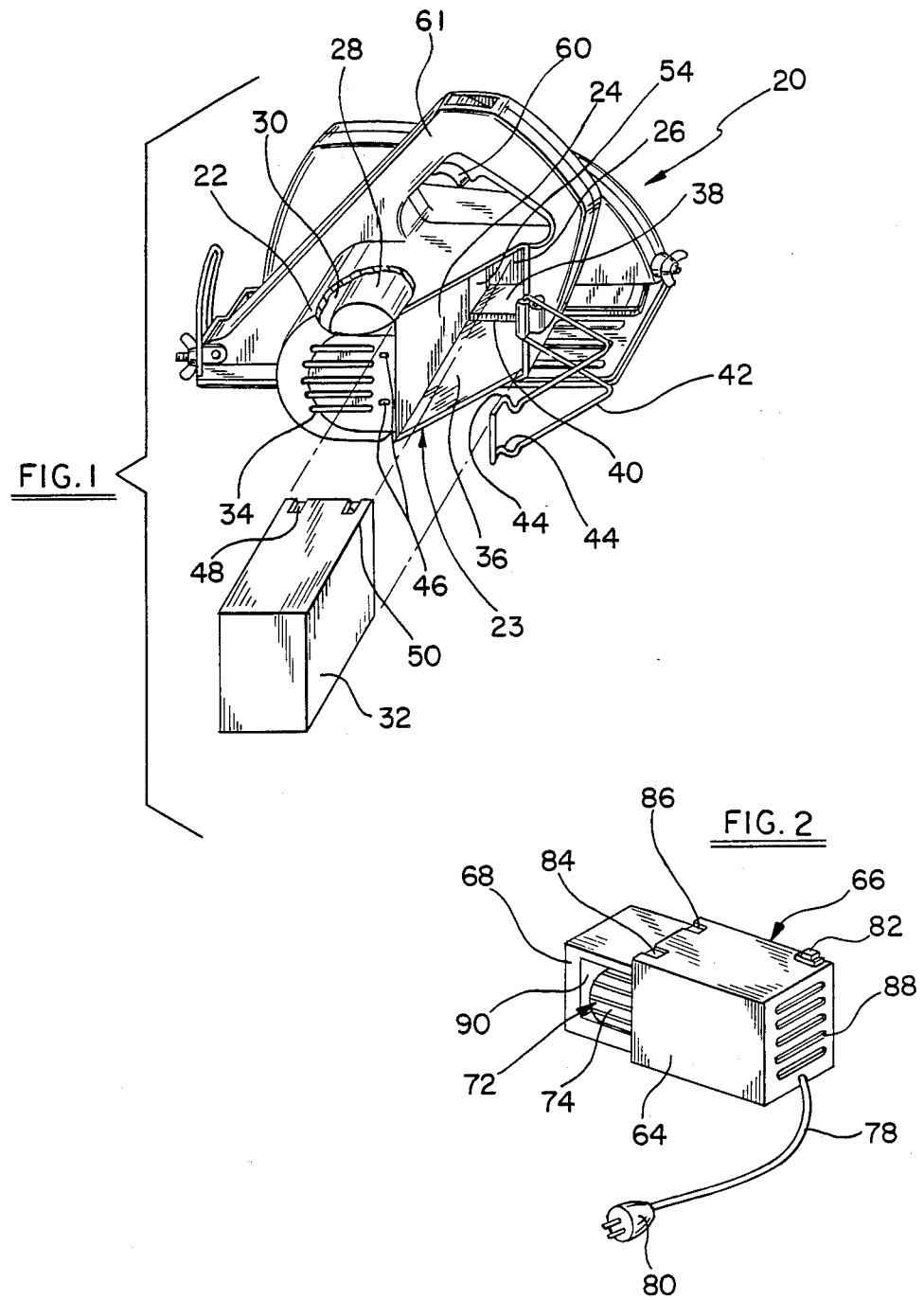

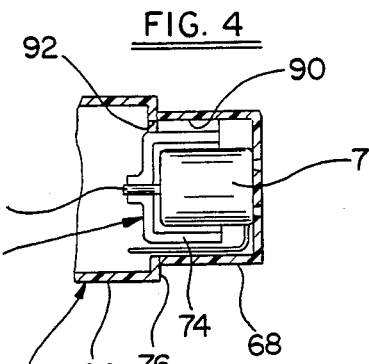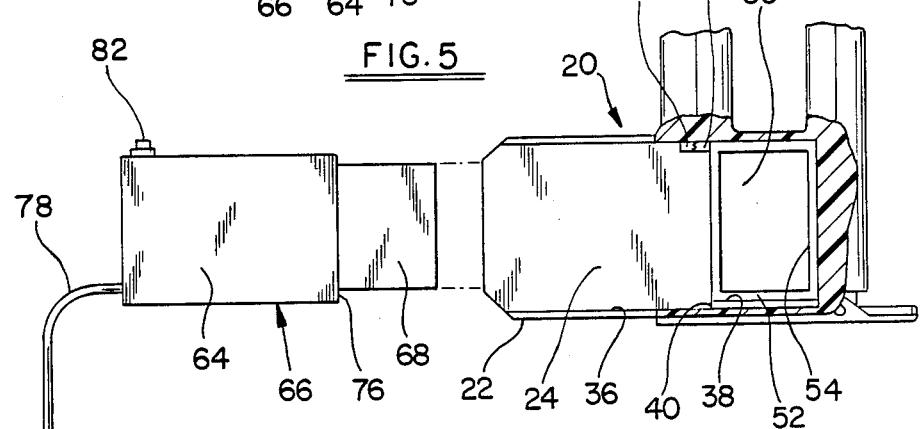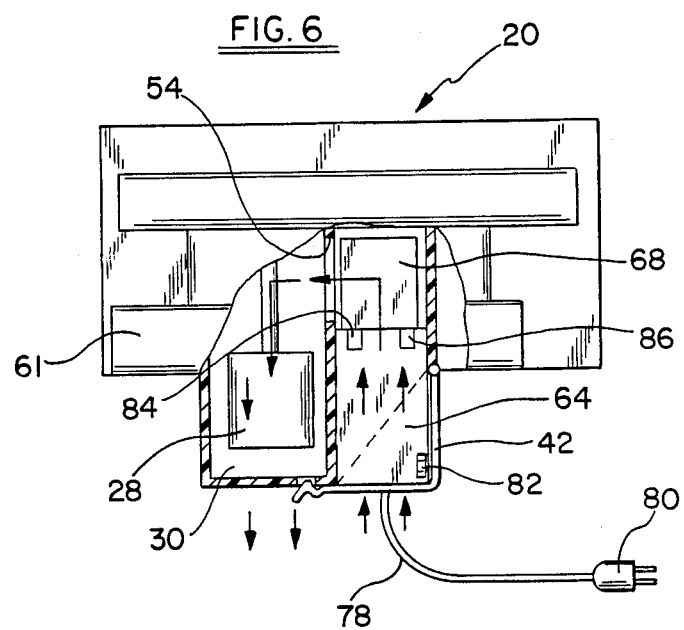

POWER-OPERATED DEVICE WITH A COOLING FACILITY

CROSS REFERENCE TO RELATED APPLICATIONS

The subject matter of the present application is related to subject matter disclosed in co-pending and commonly assigned U.S. patent application Ser. No. 07/162,122, filed on even date herewith by Pradeep M. Bhagwat and entitled "Voltage Converter" and is also related to the subject matter disclosed in co-pending and commonly assigned U.S. patent application Ser. No. 07/160,911, filed on even date herewith by Pradeep M. Bhagwat et al and entitled "Dual-Mode Corded/-Cordless System For Power-Operated Devices."

FIELD OF THE INVENTION

This invention relates to a power-operated device with a cooling facility and particularly relates to a power-operated device which can operate in a cordless mode from a self-contained power source or in a corded mode from a conventional power source with a cooling facility to cool portions of the device wile operating in the corded mode.

BACKGROUND OF THE INVENTION

One type of power-operated device, which operates in a cordless mode, typically includes a housing having a chamber for receiving and retaining a removable, enclosed battery pack in a self-contained fashion. The battery pack, which is mounted within a container, completely encloses batteries or cells contained within the pack and provides the necessary D.C. power for operation of the device. Such devices could include cordless power tools and equipment such as, for example, drills, screwdrivers, screwdriver-drills, hammer-drills, jig saws, circular saws, shears, hedge trimmers, battery-operated household products and any type of cordless powered devices which normally operate in a relatively high power range, for example, above 50 watts. Even though the cordless powered products operate in a relatively high power range, such products typically do not require a powered cooling facility.

On occasions, the operator of a cordless-mode power-operated device, as described above, may be in an area which is readily accessible to a continuous A.C. power source, or a high level D.C. voltage source. It would be most efficient if the operator could use the readily available A.C. source or high level D.C. source and thereby reserve the battery power for use in areas where the A.C. source or high level D.C. source is not available. In such instances, a voltage converter could be used to convert the A.C. voltage or high level D.C. voltage to low level D.C. voltage required to operate the powered device. However, as noted above, a typical high powered cordless device is not designed to provide powered cooling. Therefore, when such a device is powered by a continuously available source, overheating of the motor and other components of the device becomes a concern.

One example of such a voltage converter is described in the above cross-referenced U.S. patent application Ser. No. 07/161,122, entitled "Voltage Converter." Also, one example of using a voltage converter to operate a powered device in the manner noted above is described in the above cross-referenced U.S. patent application Ser. No. 07/160,911, entitled "Dual-Mode Corded/Cordless System For Power-Operated Devices."

Therefore, there exists a need for a facility for operating a low voltage device in a corded mode, while providing powered cooling at least during the corded mode of operation. Also, there is a need for a lightweight facility which can be contained within a low voltage power-operated device for operating the device in a corded mode and with powered cooling without increasing the weight and detracting from the portability of the device. Further, it is imperative that such a facility be contained to operate in an environment which is safe.

SUMMARY OF THE INVENTION

This invention contemplates a power-operated device having a power component operable at a prescribed voltage level. The device includes means for developing operating power at the prescribed voltage level. In addition, means are provided for cooling the power component. Means are also provided for containing the developing means and the cooling means together. Means are further provided for supporting the containing means in position with the power component to facilitate application of the operating power to, and the cooling of, the power component.

Other features and advantages of the present invention will become more fully apparent from the following detailed description of the preferred embodiment, the appended claims and the accompanying drawings.

BRIEF DESCRIPTION OF THE DRAWINGS

FIG. 1 is a perspective view showing a power-operated device such as an electric circular saw formed with a cavity for containing a portable power pack such as a battery pack or a voltage converter;

FIG. 2 is a perspective view showing a container which houses a voltage converter, a cooling motor and a fan cage in accordance with certain principles of the invention;

FIG. 4 is a partial side elevational view showing the cooling motor and the fan cage within the container of FIG. 2;

FIG. 5 is a partial side elevational view showing the container in position for assembly within the cavity of the housing of FIG. 1; and FIG. 6 is a plan view of the saw of FIG. 1 showing the direction of air flow to cool a motor which operates the saw and for cooling the voltage converter and cooling motor.

DESCRIPTION OF THE PREFERRED EMBODIMENT

Figure 3:
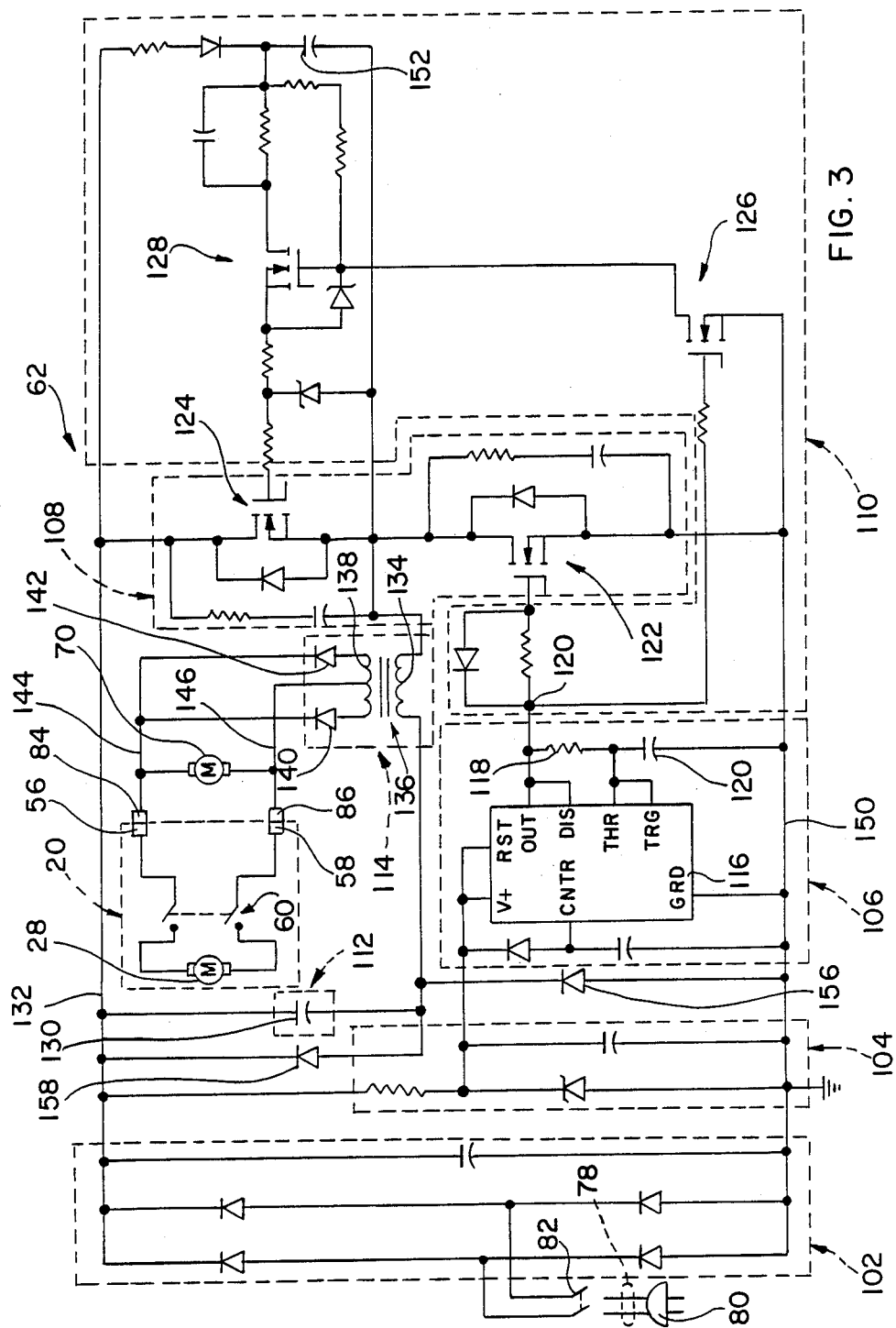
FIG. 3 is a schematic of the voltage converter which is housed within the container of FIG. 2.

Referring to FIG. 1, a cordless power-operated device, such as a circular saw 20, includes a housing 22 which is formed with a cavity 23 having a primary chamber 24 and a smaller secondary chamber 26. A power component such as low D.C. voltage drive motor 28 is mounted within a motor chamber 30 formed in housing 22. A container 32, which contains a plurality of cells of a battery pack (not shown), is shaped externally to fit into primary chamber 24 to provide a low-level D.C. voltage for operating motor 28 in a cordless mode. Housing 22 is formed with portals such as louvres 34 to provide a cooling effect for motor 28 during operation in the cordless mode.

As shown in FIGS. 1 and 5, chambers 24 and 26 are formed with floors 36 and 38, respectively, which are offset from each other to form a cavity shoulder 40. Referring again to FIG. 1, a spring clip 42 is hinged at one end to housing 22. The opposite end of spring clip 42 is formed with curved portions 44 which are retainably insertable into openings 46 formed in housing 22. After battery pack container 32 has been inserted into primary chamber 24, portions 44 of spring clip 42 are inserted into openings 46 to retain the battery pack container within the primary chamber. Container 32 is provided with terminals 48 and 50 which are connected internally of the container to the battery pack cells to facilitate external connection to the cells. As shown in FIG. 5, a side wall 52 of chamber 26 is formed with a portal such as an opening 54 which provides a passageway between chamber 26 and motor chamber 30.

In operation, container 32 is inserted into primary chamber 24 of saw 20 and is moved over floor 36 until the container engages shoulder 40. Container 32 then is secured in primary chamber 24 by spring clip 42. Terminals 48 and 50 of container 32 make contact with terminals 56 and 58 (FIG. 5), respectively, which are mounted within primary chamber 24. Terminals 56 and 58 are connectable to motor 28 through a switch 60 located in a handle 61 of saw 20. When an operator depresses switch 60, energy from the cells is supplied to motor 28 to operate saw 20 in a cordless mode.

A cordless power-operated device, such as saw 20, is lightweight and is designed for portable utility. While such a device is useful in any work area, it is particularly useful in work areas where conventional power sources are not available. Saw 20, for example, can be operated in such work areas by use of the low level D.C. voltage available from the cells within container 32 and will typically operate in a power range of, for example, 50 watts and above. While this demonstrates the clear advantage of such cordless devices, the cells have a limited charge life and must be recharged when that life has been expended. Consequently, it is important to conserve the charge life of the cells whenever possible.

At times, during use of such cordless devices, a conventional A.C. power source may be available in the work area and it would be prudent to use such an A.C. source instead of the power from the cells in order to conserve the charge life of the cells. However, cordless devices, such as saw 20, operate on a low D.C. voltage supply level such as, for example, 12 volts and could operate at other levels such as, for example, 24 volts. Typically, the conventional A.C. source in some locations provides 120 volts at 60 Hz and in other locations provides 240 volts at 50 Hz. In any event, the AC sources obviously are unsuitable for operating the cordless device.

In the preferred embodiment of this invention, a voltage converter 62, as illustrated in FIG. 3, is housed in a first section 64 of a container 66 which is illustrated in FIG. 2. The first section 64 of container 66 is identical in exterior configuration to container 32 and fits into primary chamber 24 for assembly with saw 20. Container 66 also includes a second section 68 which extends from one end of section 64 and which houses a cooling motor 70 and cooling fan cage 72 having fan blades 74 as further shown in FIG. 4. Section 68 is smaller than section 64 whereby a shoulder 76 is formed at a forward lower end of section 64 as illustrated in FIGS. 4 and 5. Also, second section 68 of container 66 is designed to fit into secondary chamber 26 of saw 20 when the container is assembled with the saw.

A cord 78 and a plug 80 extend from container 64 to facilitate connection of voltage converter 62 to an external power source such as, for example, an A.C. source. Also, a switch 82 is mounted on section 64 of container 66, as illustrated in FIGS. 2, 5 and 6, and is connected internally of the container to cord 78 as illustrated in FIG. 3. Further, voltage converter 62 is connected internally of container 66 to a pair of output terminals 84 and 86 which correspond to terminals 48 and 50 of container 32 (FIG. 1). The corded end of first section 64 of container 66 is formed with portals such as louvres 88 while a side wall of the second section 68 is formed with a portal such as opening 90. As illustrated in FIG. 4, an internal portal such as opening 92 is formed between first section 64 and second section 68 so that air can flow freely between the sections.

Voltage converter 62 is designed to operate with an A.C. input of 120 volts at 60 Hz and develops a low D.C. voltage of 12 volts. With changes in circuit parameters, voltage converter ;62 could be designed to operate at other A.C. levels and could provide other D.C. voltage levels without departing from the spirit and scope of the invention. Also, voltage converter 62 could operate from a high D.C. power source to provide the required low level D.C. voltage without departing from the spirit and scope of the invention. In addition, voltage converter 62 is capable of providing sufficient power to a device, such as saw 20, which operates in a power range of at least 50 watts and higher.

During use of saw 20 in the cordless mode, an operator may be in the vicinity of a conventional A.C. outlet which connects to a typical A.C. power source. As noted above, it would be advantageous for the operator to use the power of the A.C. source instead of the D.C. source of the cells within container 32 in order to conserve the energy of cells. With container 66 and voltage converter 62, the operator can now remove container 32 from primary chamber 24 and insert container 66 into the primary chamber and secondary chamber 26. During insertion, container section 68 moves over chamber floor 38 and container section 64 moves over chamber floor 36 until container shoulder 76 engages and abuts cavity shoulder 40. Spring clip 42 then is positioned to secure container 66 with saw 20. During assembly of container 66 with saw 20, terminals 84 and 86 will make contact with terminals 56 and 58 (FIGS. 3 and 5), respectively. Thereafter, plug 80 is connected to the available A.C. source (not shown) and switch 82 is closed to enable voltage converter 62 to operate cooling motor 70 and thereby rotate fan cage 72. In addition, low level D.C. voltage appears at switch 60 so that upon closure of the switch, motor 28 and saw 20 are operated.

Thus, saw 20 is operable in a cordless mode when container 32 and the cells therein are mounted in chamber 24, and is operable in a corded mode when container 66 and voltage converter 62 are mounted in chambers 24 and 26. Even though saw 20 always requires a low D.C. voltage such as 12 volts for operation, the saw becomes a dual mode power-operated device with the interchangeability of containers 32 and 66.

As illustrated in FIG. 1, housing 22 is formed with louvres 34 which provide for powerless cooling of motor 28 during operation of saw 20 in the cordless mode. While this type of cooling is sufficient when saw 20 is operated in the cordless mode, it may not be sufficient when the saw is operated in the corded mode. For example, when saw 20 is operated in the cordless mode, it is typically not operated for extended and continuous periods because of the limited life of the battery pack cells. However, when saw 20 is operated in the corded mode, it may be operated for extended and continuous periods due to the continuous availability of the conventional A.C. source and the needs and habits of the operator.

In any event, it is advantageous to equip saw 20 with a facility to provide positive powered cooling during periods when the saw is operating in the corded mode to insure that such cooling is available when the saw is operated for extended periods.

In the preferred embodiment as illustrated in FIG. 4, cooling motor 70 is located within second section 68 of container 66. Fan cage 72 with blades 74 is mounted on a shaft 94 of cooling motor 70. Also, fan cage 72 extends from shaft 94 toward and about motor 70 and is positioned in a wrap-around fashion about a portion of the motor. This arrangement of motor 70 and fan cage 72 conserves space and provides for compactness of container 66. Voltage converter 62 (FIG. 3) is mounted within first section 64 of container 66 and is connected to motor 70 by wiring (not shown) which passes through internal portal 92.

As container 66 is located within chambers 24 and 26 by virtue of container shoulder 76 abutting cavity shoulder 40, opening 90 of the container is located adjacent opening 54 of secondary chamber 26 of cavity 23. Referring to FIG. 6, when switch 82 is operated, voltage converter 62 supplies energy to operate cooling motor 70 whereby fan cage 72 is rotated. As fan cage 72 rotates, blades 74 draw cooling medium such as air through louvres 88 (FIG. 2) at the corded end of container 66, through section 64 of the container which houses voltage converter 62 and into section 68. The cooling air is then forced through the aligned opening 90 of container 66 and opening 54 of secondary chamber 26 and into motor chamber 30, to cool motor 28, and thereafter exits through housing louvres 34.

In this manner, saw motor 28 is continuously power cooled by the operation of cooling motor 70. Also, voltage converter 62 is cooled along with the cooling of motor 70 which provides for the efficient operation of the voltage converter. Further, the powered cooling is provided only when needed, that is during use of saw 20 in the corded mode. Otherwise, when saw 20 is operated in the cordless mode, motor 28 is cooled in a powerless fashion through louvres 34.

Saw 20 can be operated by closing switch 60 (FIGS. 1 and 3) with assurance that saw motor 28 will be continuously power cooled during operation of the saw in the corded mode. This alleviates any concerns for overheating of motor 28 during long term continuous use of the saw in the corded mode of operation.

In the illustrated embodiment, switch 82 controls the application of operating power to voltage converter 62 and, thereby, the operation of motor 70 and, through switch 60, the operation of motor 28. The operation of the voltage converter 62 and motors 28 and 70 could be controlled by an appropriately connected single switch such as, for example, switch 60, without departing from the spirit and scope of the invention. Then, after container 66 has been assembled with saw 20, an operator may operate the saw, along with the powered cooling, solely by the depression of switch 60.

Voltage converter 62 is described in detail in U.S. patent application Ser. No. 07/161,122, filed on even date herewith, the disclosure of which is incorporated herein by reference thereto. The referenced application is titled VOLTAGE CONVERTER, is assigned to the same assignee as the present application, namely, Black & Decker Inc.

Referring again to FIG. 3, voltage converter 62 includes a primary power source such as a power input circuit 102, an oscillator power supply 104, an oscillator 106, a power switching circuit 108, a drive circuit 110 for the power switching circuit, a secondary power source 112 and a load circuit such as an output 114.

Oscillator 106 includes a CMOS RC timer 116 which is a self-contained chip of the type identified as an ICM 7555 available from Intersil, Inc. of Cupertino, Calif. A resistor 118 and a capacitor 120 establish the frequency of operation of oscillator 106.

Power switching circuit 108 includes a pair of N channel power MOSFET transistors 122 and 124 which function as voltage sensitive devices and develop a capacitive charge during operation. Drive circuit 110 includes another pair of N channel power MOSFET transistors 126 and 128.

Secondary power source 112 includes a capacitor 130 which is connected on one side to one output line 132 of power input circuit 102 and on the other side to one side of a primary winding 134 of a step-down transformer 136 of output 114. The other side of primary winding 134 is connected to a node between the drain and source electrodes of transistors 122 and 124, respectively, as illustrated in FIG. 3. The outside terminations of a center-tapped secondary winding 138 of transformer 136 are connected to diodes 140 and 142 of a full-wave rectifier. A positive output line 144 of the rectified output is connected to diodes 140 and 142 while a negative output line 146 of the rectified output is connected to a center tap of secondary winding 138.

Output lines 144 and 146 are connected internally of container 66 (FIG. 2) to terminals 84 and 86 (FIGS. 2, 3 and 6), respectively. As illustrated further in FIG. 3, terminals 84 and 86 are connected to terminals 56 and 58, respectively, which are connectable to motor 28 through switch 60.

In operation, voltage converter 62 is connected through cord 78, plug 80 and switch 82 to the conventional alternating current source. In the preferred embodiment, the alternating input is rectified and the rectified voltage is coupled to oscillator power supply 104 to provide operating power for oscillator 106. As oscillator 106 is operating, power switching transistors 122 and 124 operate alternately at the frequency of the oscillator.

During the operation of transistor 122, transistor 126 of drive circuit 110 is also gated ON to couple the gate electrode of transistor 128 to a ground-reference line 150 which is the other output line of power input circuit 102 to maintain transistor 128 in the OFF state. Also, during this period, a capacitor 152 of drive circuit 110 is charging through the source and drain electrodes of transistor 122. Further, during the operation of transistor 122, current flows from line 132, through capacitor 130, primary winding 134 and the drain and source electrodes of transistor 122 to line 150. During this period, capacitor 130 is charged to a selected voltage level. The voltage appearing across primary winding 134 is stepped down from the primary winding to an active first half of the center tapped secondary winding 138.

Eventually, and under control of oscillator 106, transistors 122 and 126 are turned off whereby the charged potential of capacitor 152 biases transistor 128 ON and, in turn, is coupled through the drain and source electrodes of transistor 128 to bias ON transistor 124. When transistor 122 is turned off, current ceases to flow from the power input circuit 102 through capacitor 130 and primary winding 134. However, transistor 124 is now turned on which provides a closed-loop path including capacitor 130 and primary winding 134 thereby normally providing a discharge path for the capacitor.

During the discharge of capacitor 130, the capacitor functions as a secondary D.C. power source within voltage converter 62. As capacitor 130 discharges, current flows through the drain and source electrodes of transistor 124 and through primary winding 130 in a direction opposite from the previous current flow when transistor 122 was operating. Effectively, then, the stored potential of capacitor 130 is applied across primary winding 134 but with reverse polarity. This voltage is then stepped down from primary winding 134 to an active second half of the center tapped secondary winding 138 where the low voltage is rectified and applied between output lines 144 and 146.

If an overcurrent situation occurs in the output of the transformer 136 when transistor 122 is ON, e.g., a short-circuit or overload condition in either of the motors 28 and 70, the inductive impedance of transformer 136 becomes extremely small and capacitor 130 will charge quickly to the level of the supply voltage between lines 132 and 150. The magnitude of the field about the inductive circuit presented by transformer 136 under these conditions is significantly large and seeks to keep the current flowing in the same direction by virtue of the stored energy in the magnetic field. Normally, this condition would cause capacitor 130 to charge to an even higher voltage level and would start the circuit into an undesirable oscillation mode, thereby saturating transformer 136.

In order to prevent this overload induced oscillation with transistor 122 biased to its ON state, the current resulting from the stored energy of the magnetic field of the inductive circuit of transformer 136 is directed through a loop which includes the drain and source electrodes of transistor 122, a diode 156, and the primary winding 134 of the transformer 136. The resulting current continues in this loop until the field has completely dissipated. During this time, the charge on capacitor 130 remains at the supply voltage level and any tendency for oscillations are damped to preclude any catastrophic event during the period when transistor 122 is ON.

When transistor 122 is switched to its OFF state and transistor 124 is switched to its ON state during the overload or short circuit condition, capacitor 130 is now in a closed loop with the transformer inductance and the drain and source electrodes of the transistor 124. Capacitor 130 remains charged to the level of the previous charge which is the charge achieved during the period when transistor 122 was ON. Due to the low impedance in the inductive circuit of transformer 136, previously charged capacitor 130 discharges rapidly through the low impedance to essentially zero volts. As capacitor 130 discharges rapidly, a magnetic field is developed rapidly about the transformer inductance. When capacitor 130 is fully discharged, the stored energy of the field about transformer 136 tends to maintain current flow in the same direction as when the capacitor 130 was discharging, whereby the continued current flow would charge the capacitor 130 in the negative direction. With capacitor 130 charged in the negative direction, the power supply of power input circuit 102 and the negative charge on the capacitor would then be in a cumulative arrangement to provide a total voltage which greatly exceeds the output voltage of the power input circuit when transistor 122 is again biased ON.

This condition could again lead to a catastrophic event because of the significant voltage levels which would lead to the saturation of transformer 136 and the resultant destruction of circuit components. A diode 158 is connected in parallel circuit with capacitor 130 to preclude the above-described reverse charging of the capacitor. After capacitor 130 has been fully discharged, the current resulting from the stored energy of the magnetic field field of transformer 136 will seek the least-impedance path and pass through diode 158 to bypass capacitor 130. Eventually, the stored energy is fully dissipated and a steady-state condition attained for the remainder of the period when transistor 124 is ON.

Thus, by connecting the diodes 156 and 158 in the voltage converter 62, undesirable oscillations in the converter are precluded when a short circuit or overload occurs in any load, such as the motors 28 and 70, connected to the output of the transformer 136.

Thus, voltage converter 62 initially converts the low frequency input to a high level D.C. voltage, then to a high frequency voltage level which is thereafter effectively transformed and rectified to the low D.C. voltage supply level required to operate saw 20. The output of voltage converter 62 is then applied to cooling motor 70 and, through switch 60, to saw motor 28. In this manner, saw motor 28, as well as voltage converter 62, is continuously power cooled and saw motor 28 is operated on demand b the closing of switch 60.

Further, while the preferred embodiment of voltage converter 62 converts a low frequency, high voltage level to a low D.C. voltage level, the converter can be used to convert a high D.C. voltage level to a low voltage D.C. level by applying the high D.C. level directly to the output side of power input circuit 102. From that point, converter 62 would function in the manner described above to provide for the D.C. to D.C. conversion. Therefore, converter 62 could be arranged in container 66 so that the converter could be connected directly to a high D.C. voltage source as an external power source. In this manner, saw 20 could be operated through voltage converter 62 from the high D.C. voltage source instead of the low D.C. voltage of the cells within container 32 and thereby conserve the charge life of the cells.

Voltage converter 62 could be designed to operate from external A.C. power sources other than 120 volts at 60 Hz such as, for example, 240 volts at 50 Hz. Also, voltage converter 62 could be designed to provide D.C. output voltage levels in a range of 3.6 to 48 volts. In a particular example, transformer 136 could be connected to provide transformation to develop a D.C. output of 24 volts between output lines 144 and 146. Voltage converter 62 could then be used with container 66 to provide the dual mode capability for power-operated devices which operate at a D.C. voltage supply level of 24 volts.

Saw 20 is merely illustrative of one example of many power-operated, cordless-mode devices which become more versatile because of the inventive dual mode capability with powered cooling. Other examples of power-operated cordless devices which are enhanced by the inventive dual mode capability with powered cooling include, but are not limited to, screwdrivers, screwdriver-drills, hammer drills, jig saws, circular saws, hedge trimmers, grass shears, as well as battery-operated household products and the like.

The above-described embodiments, of course, are not to be construed as limiting the breadth of the present invention. Modifications, and other alternative constructions, will be apparent which are within the spirit and scope of the invention as defined in the appended claims.

What is claimed is:

1. A power-operated device having a powered driver operable at a prescribed voltage level, which comprises:
   means for developing operating power at the prescribed voltage level;
   means for cooling the powered driver;
   means for containing the developing means and the cooling means together; and
   means for supporting the containing means in position with the powered driver to facilitate the application of the operating power to and the cooling of the powered driver.

2. The power-operated device as set forth in claim 1, which further comprises:
   means for applying the operating power of the developing means at the prescribed voltage level to the power driver and the cooling means.

3. The power-operated device as set forth in claim 1, which further comprises:
   means for connecting the operating power developing means to an external power source to facilitate operation of the operating power developing means.

4. A power-operated device having a motor operable at a prescribed voltage level, which comprises:
   a housing for containing the motor and formed with a cavity therein;
   means for developing operating power at the prescribed voltage level;
   means for cooling the motor;
   means for containing together the developing means and the cooling means;
   the containing means configured externally to fit into the cavity;
   means for connecting the developing means to the motor and the cooling means to provide operating power thereto, and
   means for connecting the developing means to an external power source to facilitate operation of the developing means.

5. A power-operated device having a drive motor operable at a prescribed voltage level normally associated with a cordless mode of operation which comprises:
   a housing formed with a motor chamber for containing the drive motor and formed with a cavity therein configured for receipt of a container which houses a cordless-mode power source;
   means for developing operating power at the prescribed voltage level;
   means for cooling the motor;
   means for containing together the developing means and the cooling means;
   the containing means configured to fit into the cavity interchangeably with the cordless-mode container;
   means for connecting the developing means to the motor and to the cooling means to provide operating power thereto, and
   means for connecting the developing means to an external power source to facilitate operation of the developing means.

6. The power-operated device as set forth in claim 5 wherein the cooling means cools the operating power developing means.

7. The power-operated device as set forth in claim 5, wherein the cooling means includes:
   means formed in the housing for facilitating the movement of a cooling medium through the motor chamber;
   means formed in the containing means for facilitating the movement of the cooling medium through the containing means, and
   means formed in the housing for facilitating the movement of the cooling medium between the motor chamber and the containing means to thereby permit cooling of the drive motor.

8. The power-operated device as set forth in claim 5, wherein the cooling means includes:
   cooling medium portals formed in spaced portions of the containing means to permit the passage of the cooling medium therethrough;
   cooling medium portals formed in spaced portions of the motor chamber to permit the passage of the cooling medium therethrough, and
   means for locating at least one cooling medium portal of the containing means in alignment with at least one cooling medium portal of the motor 12 chamber to permit the passage of the cooling medium therethrough.

9. The power-operated device as set forth in claim 5 wherein the cooling means includes:
   a cooling motor, and
   a fan cage operated by the cooling motor.

10. The power-operated device as set forth in claim 9 wherein the fan cage is positioned about the exterior of the cooling motor.

11. The power-operated device as set forth in claim 4 wherein the developing means operates in a power output range of 50 watts and higher.

12. The power-operated device as set forth in claim 5 wherein the voltage supply level is in a range of 3.6 volts to 48 volts D.C.

13. The power-operated device as set forth in claim 5, which further comprises means located on the exterior of the housing for securing the containing means within the cavity of the housing.

14. The power-operated device as set forth in claim 5 wherein the developing means includes:
   means for converting voltage of the external power source to a high frequency A.C. voltage;
   means for transforming the high frequency A.C. voltage to a low level A.C. voltage, and
   means for rectifying the low level A C. voltage to a D.C. voltage level equal to the prescribed voltage level of the drive motor.

15. A power-operated device having a drive motor, which comprises:
   a housing formed with a motor chamber, a cavity and a portal between the motor chamber and the cavity;

means for developing operating power at a predetermined voltage level;
a cooling motor operable at the predetermined voltage level;
a fan cage attached to and operable by the cooling motor;
a container for supporting the operating power developing means, the cooling motor and the fan cage;
the container formed with a portal and configured to be insertable within the cavity with the container portal aligned with the housing portal, and
means for applying the operating power of the developing means to the cooling motor to facilitate the movement of a cooling medium about the drive motor.

16. The power-operated device as set forth in claim 15, which further comprises:
the drive motor being operable at the predetermined voltage level, and
means for applying the operating power of the developing means to the drive motor.

17. The power-operated device as set forth in claim 15 which further comprises:
a shaft extending from the cooling motor, and
the fan cage mounted on the shaft and extending toward and about the drive motor.

* * * * *